Figure 4:
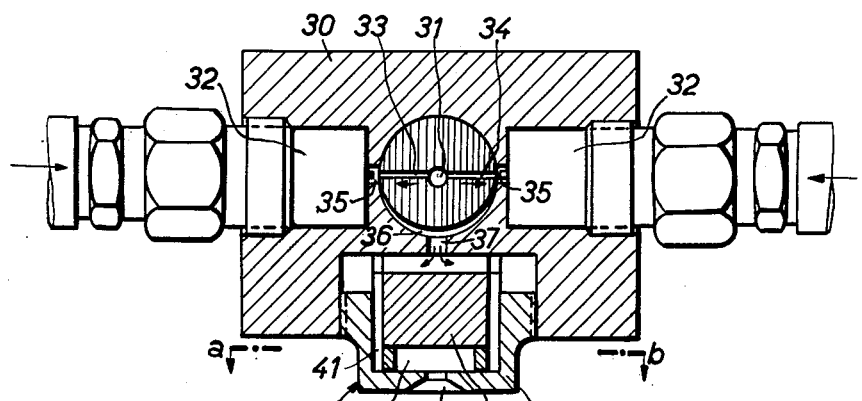

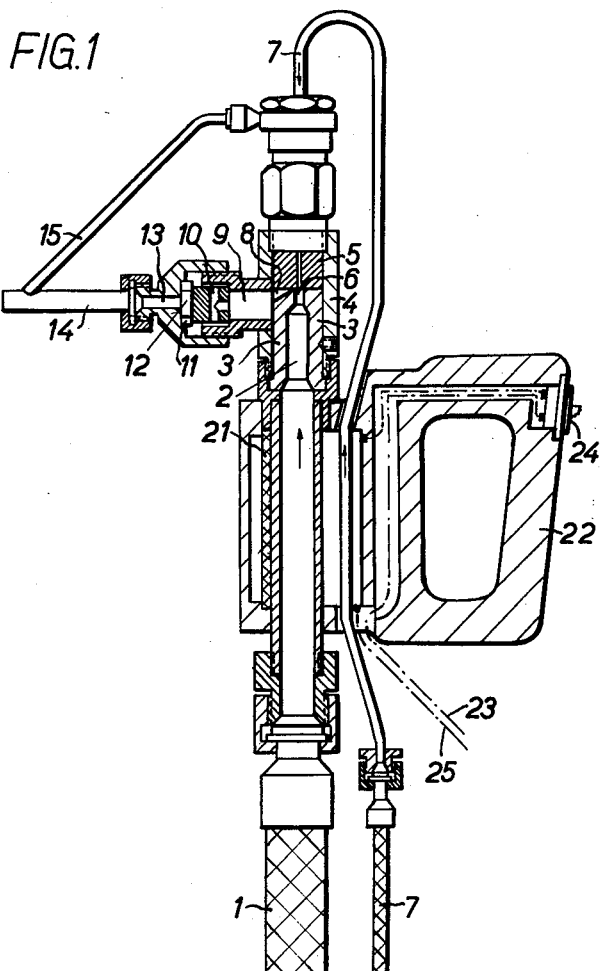
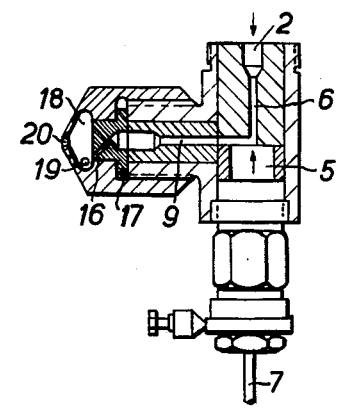
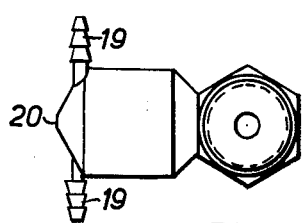

SECTION a-b

Jan. 15, 1963   E. WEINBRENNER ETAL   3,073,533
METHOD OF AND APPARATUS FOR PRODUCING PLASTICS
Filed May 6, 1957   3 Sheets-Sheet 3
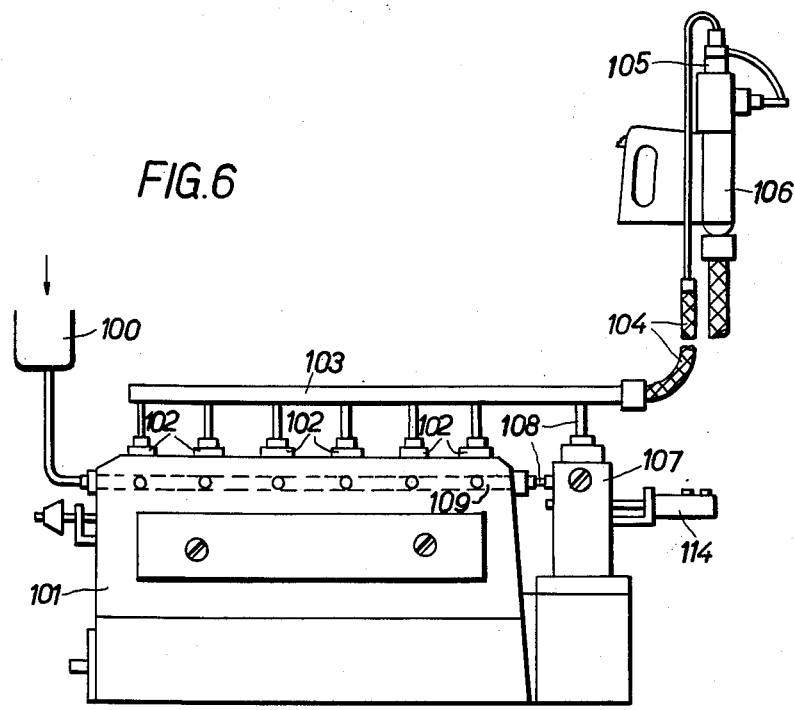
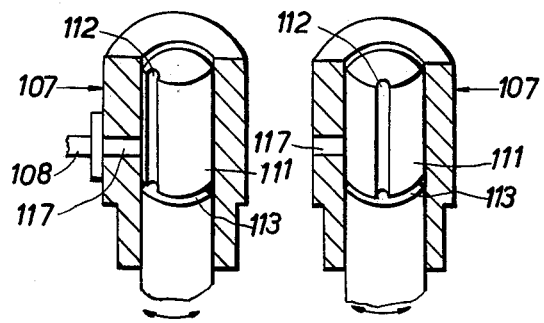
INVENTORS:
ERWIN WEINBRENNER, PETER HOPPE, KARL BREER.
BY
ATTORNEY United States Patent Office 3,073,533
Patented Jan. 15, 1963

3,073,533
METHOD OF AND APPARATUS FOR PRODUCING PLASTICS
Erwin Weinbrenner, Leverkusen, Peter Hoppe, Troisdorf, and Karl Breer, Koln-Flittard, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
Filed May 6, 1957, Ser. No. 657,319
Claims priority, application Germany May 7, 1956
3 Claims. (Cl. 239—399)

This invention relates to a method of and an apparatus for producing plastics, especially polyurethane plastics, from the components forming said plastics.

Hitherto, it has been common practice to mix the components of plastics by mechanical agitation. In the production of plastics, such as polyurethane plastics, the components of which are difficult to mix, the mixing can be carried out more effectively by pressure injection followed by agitation with a high-speed stirrer.

Owing to the necessity of mechanical agitation, which entails the use of a driving motor, the production of polyurethane plastics and other plastics made from components that are difficult to mix has been restricted in most instances to the use of stationary apparatuses. Stationary equipment, however, can be used only where the object to be produced is movable. It is, for instance, suitable for the production of materials in block-like or web-like form or for filling molds arranged consecutively one after the other. On the other hand, serious difficulties have been encountered in the production of large objects and in the coating of large or long objects, such as in the insulation of a refrigeration space or of pipe lines with plastic foam.

It is an object of the present invention to provide a process for the production of plastics from components that are difficult to mix. Another object is to provide a process for the production of plastic bodies of large volume or surface. A further object is to provide a process for the production of plastics from their components which can be carried out in a small and portable apparatus. A further object is to provide an apparatus for carrying out the process of the invention. Still further objects will appear hereinafter.

As disclosed in copending application Ser. No. 596,117, filed July 5, 1956, now abandoned, of which this application is a continuation-in-part, the components of plastics, such as polyurethane plastics, can very effectively be mixed if a mixture of said components is subjected to conditions which will impart turbulent motion thereto.

In order to impart turbulent motion to the initial mixture, the latter is caused to flow into a space of smaller cross-sectional area and subsequently into a space of larger cross-sectional area and finally discharged from the last-mentioned area through an orifice.

The initial mixture may be prepared by any suitable means, but according to the preferred embodiment of the invention described in the above copending application, the initial mixture is prepared by injecting at least one of the components to be mixed into a stream of the other component(s). In the case of plastics, which are formed by two components, it is preferred to inject the component to be used in a smaller amount into a stream of the component to be used in a larger amount. If the plastic is formed by three or more components, two or more components are mixed initially and the remaining component is injected into the stream of the mixture. In each case, the injection is preferably in counter-current to the stream of the other component(s).

Components of plastic materials that can be mixed in accordance with the process described in the above copending application are reactants which undergo chemical reactions resulting in the formation of plastic materials. However, the process is also applicable to the mixing of components which do not react chemically with one another but produce merely physical changes leading to the formation of a desired end product. The process described in the above copending application is particularly useful where the components of plastic materals are difficult to mix, such as in the production of polyurethane plastics from viscous polymeric hydroxyl compounds, such as hydroxyl polyesters, polyalkylene ether glycols and prepolymers, and polyisocyanates, such as toluylene diisocyanate, which are ordinarily thin liquids.

An apparatus for carrying out the process of the above copending application comprises a portable mixer containing a chamber for the pressure injection and a spin chamber where the initial mixture obtained in the injection step is finally mixed by turbulent motion.

The pressure required for the injection is preferably built up by means of gear wheel pumps, injection pumps or plunger pumps, which are advantageously fixedly arranged. The rate at which the separate components are introduced is preferably controlled by means of time relays influencing the pumps. The pressure at which the continuously streaming component is introduced may be within the range of 2–100, preferably about 10 to about 50 atmospheres, whereas the pressure of the component to be injected into that continuous stream may well amount from 10–1000, preferably from about 80 to about 200 atmospheres. The frequency of injections is substantially in the range of 100–10,000, preferably in the range of about 5000 to about 10,000 injections per minute. Alternatively, the injection can be effected continuously.

An apparatus suitable for carrying out this process consists of a mixing head constructed as a hand appliance and provided with preferably flexible supply lines for the components to be mixed, the mixing head containing a device for pre-mixing the components by means of counter-current pressure injection and also containing a final mixing chamber for the pre-mixed components. The final mixing chamber can in addition have tangential connections for the introduction of compressed air or gas under pressure. In the hand appliance the components are preferably supplied through nozzles or valves which are automatically shut off in order to prevent clogging of the nozzles when the appliance is not operating.

Embodiments of apparatus for carrying out the method of the invention as disclosed in the above copending application are shown diagrammatically in the accompanying drawings.

FIGURE 1 is a view partially in section through a hand mixing appliance, while FIGURES 2 and 3 show a hand mixing nozzle with a supplementary final mixing chamber having a tangential compressed air connection.

The main component, for example a polyester, polyether or a prepolymer prepared by reacting the latter with a polyisocyanate, is fed by means of a gear wheel pump through a pipe 1, preferably a flexible pipe, into a passage 2 of a nozzle element 3, which is accommodated in a housing 4. An injection nozzle 5 opens directly into an inoculation passage 6 and mixes the second component with the main component by spraying the secondary component counter-current to the main component flowing through the passage 2, the secondary component being introduced via an injection pump (not shown) and a pipe 7, which is preferably flexible. The initially mixed material flows through a channel 8 and a supply passage 9, and then flows through a T-bore 10 and tangential bores or slots 11 into an eddy chamber 12. Due to the continuous flow, the homogeneous reactive mixture can then discharge by way of a discharge bore 13 and an outlet pipe 14 connected thereto. Leakage liquid formed at the injection nozzle 5 is fed by way of pipe 15 to the outlet pipe 14.

In the embodiment shown in FIGURE 2, the pre-mixed liquid is supplied through bores 16 of a nozzle plate 17 into a mixing chamber 18, in which a stream of compressed air blown in tangentially through pipes 19 causes intense mixing. The prepared mixture issues from a bore 20.

The hand mixing appliance has a handle 22. The pumps (not shown) are controlled by means of a control line 23. The apparatus also has a switch 24 for switching the control line 23 on and off, and a conductor cable 25 for a heating system 21, which serves to pre-heat the components before they enter the pre-mixing chamber.

Although the continuous flow of the material through the tangential bores or slots 11 results in a turbulent motion in the eddy chamber 12, the turbulent motion is considerably increased by blowing in compressed air as described above in connection with the embodiment of the mixing device shown in FIGURE 2.

It has now been found in accordance with the present invention that the use of compressed air can be dispensed with and yet a high degree of turbulence can be obtained if the final mixing chamber is in the form of an atomizing nozzle which operates through liquid pressure. One embodiment of an apparatus according to the instant invention which contains an atomizing nozzle is shown diagrammatically in the drawing in which FIGURE 4 is a cross-sectional view through a mixing head constructed in accordance with the invention and FIGURE 5 is a cross-sectional view through the final mixing chamber of this mixing head along the line *a—b*.

Figure 5:
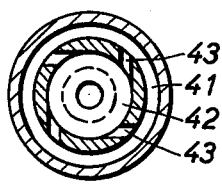

In FIGURE 4 the numeral 30 represents the housing of the mixing head, 31 the supply opening for the main component, for example the polyester or polyether plus the activator, while 32 indicates two injection nozzles through which the secondary component, for example the isocyanate is supplied countercurrently to the mixture of polyester or polyether and activator flowing through the bores 33 and 34 in the direction of the arrows. The injection or inoculation chambers 35 in which the first mixing of the components takes place are connected through semi-annular groove 36 to the bore 37. The supply bore of the atomizing nozzle 38 is in the form of an annular chamber 41 defined by the wall of the nozzle head 40 and the spinning member 39. The spinning member 39 also defines a circulation or eddy chamber 42 within the nozzle and is provided with tangential slots 43 which provide a connection between the annular chamber 41 and the circulation chamber 42.

The mixture issuing from the opening 37 passes into the annular chamber 41 and through the tangential slots 43 into the circulation chamber 42 where it is finally mixed by the circulatory movement of the spinning member 39 and is expelled in finely atomized form through the nozzle head 40 through the opening 44. The angle of spread of the issuing jet depends on the size and guide length of the opening 44.

When the above-described portable mixing apparatus is operated intermittently or when a relatively long interruption in the mixing process is necessary, certain difficulties are encountered. These difficulties are due to the fact that the pistons of the injection pump act on one injection nozzle in the mixing head. When the pump is in the rest position, at least one of those pistons will still be in the working position, thus causing a danger of leakage from the nozzle since the pressure in the supply pipe between the pump and the mixing head nozzle cannot drop. The leakage from the nozzle, which may be further increased by wear and tear of the needle seating of the nozzle, results in a slow reaction within the mixing head, which in turn, leads to clogging and undesirable shutdowns for the purpose of taking the mixing head apart and cleaning it.

It has now been found that these defects are obviated if, in accordance with the invention, a controllable relief valve is arranged after the injection pump in a by-pass connection betwen the pump delivery pipe and the pump suction chamber. The relief valve is designed as a rotary circular slide valve, which is provided at its periphery with a longitudinal groove and a transverse groove. The control of the slide valve is effected by a solenoid, pneumatic or hydraulic cylinder or a mechanical linkage, which is preferably coupled to the switching-off means of the injection pump. When the pump is idle, it is therefore possible for the pump delivery pipe to be short-circuited with the suction chamber of the pump by changing over the relief valve by means of the solenoid or other drive. The relief valve is at the shut-off position when the pump is delivering and is opened by means of the solenoid or other drive upon the shutting off of the pump, whereby the pressure remaining in the delivery pipe between the pump and mixing head nozzle is then only equal to the pressure of 0.5 to 2 atm. gauge which is applied to the storage reservoir for the material to be sent through the nozzle.

FIGURE 6 is a plan view of the injection pump with mixing head attached. FIGURES 7 and 8 are cutaway perspective views of a portion of the relief valve 107 shown in FIGURE 6.

One embodiment of the invention containing such a solenoid-actuated relief valve is shown diagrammatically in FIGURES 6–8 of the drawing. In FIGURE 6 the numeral 101 represents a six-cylinder high-pressure injection pump with pistons 102 and a manifold 103. The measured liquid is conveyed through a high-pressure hose 104 to the mixing head nozzle 105 which is arranged in the mixing device 106. The relief valve 107 permits the liquid remaining under high pressure in the hose 104 after the pump has been shut off to flow back from the hose and through the pipe 108 into the pump suction chamber 109, which is in communication with the storage reservoir 100, so that the high pressure of for example 250 atm. gauge in the main pipe 104 is reduced to the pressure in the reservoir 100, which is normally between 0.5 and 2 atm. According to FIGS. 7 and 8, the relief valve is in the form of a rotary slide valve 111, which has a longitudinal groove 112 and a transverse groove 113. On being changed over by means of the solenoid 114 (FIG. 6), the relief valve can be shifted from the zero position (FIG. 7) to the pressure delivery position (FIG. 8). The return flow from the pressure pipe 104 (FIG. 6) takes place in the zero position through the pipe 108 by way of the longitudinal groove 112 and through the bore 117 (FIG. 7) and pipe 108 into the suction chamber 109 of the piston pump.

The process of the present invention is particularly suitable for mixing polyesters or polyethers with isocyanates in order to produce polyurethane foam. It was not to be expected that components of widely different viscosities could be mixed without subsequent mechanical stirring. The process and the apparatus, therefore, constitute an important technical advance. The method may also be used for mixing polyester resins with styrene and linear and cross-linked polyesters with polyisocyanates. With the aid of the portable mixing device of the present invention, polyurethane foam and other plastics can be applied to chemical apparatus and pipe lines, which are already installed, to produce insulating layers.

In the production of polyurethane plastics in accordance with the invention, a polyisocyanate is injected into a stream of a polymeric hydroxyl compound, such as an hydroxyl polyester or a polyalkylene ether glycol and the mixture thus obtained is then swirled into turbulent motion. In the case of polyurethane plastics, the production of which may require a third component, such as a cross-linking agent or an accelerator, the third component may be added to the polymeric hydroxyl compound. Thus, in the production of polyurethane foam from hydroxyl polyesters or hydroxyl polyethers, excess polyisocyanate and a small amount of water, the required amount of water and, if desired, an accelerator and a surface active agent are added to the hydroxyl compound and introduced with the same into an injection chamber where the polyisocyanate is counter-currently injected into the flowing mixture. These components are introduced into the injection chamber in the proportions commonly used in the production of polyurethane foam. Thus, a linear or branched hydroxyl polyester or hydroxyl polyether having an hydroxyl number within the range of 20 to 500 is mixed with 0.5 to 3% by weight of water, 0.5 to 10% by weight of an emulsifier and 0.1 to 4% of a tertiary amine based on the weight of said hydroxyl polyester. Into this mixture, there are injected 0.6 to 10 mols of diisocyanate per 17 grams of hydroxyl contained in the hydroxyl compound.

Another possible use of the apparatus of the invention is the injection of gases into liquids for the purpose of charging the liquids with gas or for foaming purposes. It is also possible for a plurality of mixing heads at predetermined intervals to be combined with one another in order to make predetermined applications simultaneously, for example in series production. This is the case, for example, when foam is to be applied to corners in refrigerators, it being possible for foam to be simultaneously applied with four nozzles spaced to correspond with the corners. The foam components can be supplied to the nozzles by means of a central pumping station or by separate pumps and control relays for each mixing head.

Broadly speaking, the apparatus of the invention can be used to particular advantage where components have to be mixed which react at a very high speed, such as in the production of polyurethane plastics or in the production of copolymers from copolymerizable components in the presence of peroxide catalysts.

The invention is further illustrated by the following examples without being restricted thereto.

*Example 1*

Manufacture of an elastic polyurethane foam:

Component A—Toluylene diisocyanate
Component B—consisting of
  100 parts by weight of a polyester of adipic acid, glycol and trimethylol propane,
  10 parts by weight of an activator mixture consisting of water, emulsifiers and accelerator with a base of adipic acid and n-diethyl-amino-ethanol, in the ratio (parts by volume) of 1:1:3.

Component B is passed through the injection chamber at a flow rate of 3 l./min. and at a pressure of 25 atmospheres. The component A is counter-currently injected into the flowing mixture (component B) at a rate of 1.08 l./min. using a pressure of about 140 atmospheres.

The mixture thus obtained is introduced into a space of smaller cross-sectional area (tangential bores 11 in FIGURE 1 and bores 16 of the nozzle plate 17 in FIGURE 2) into a space of larger cross-sectional area (eddy chamber 12 in FIGURE 1 and chamber 18 in FIGURE 2). The final mixture is discharged in the liquid state through an orifice (13 in FIGURE 1 and 20 in FIGURE 2). Outside the apparatus at any desired place reaction takes place to give an elastic polyurethane foam.

*Example 2*

Manufacture of a rigid polyurethane foam:

Component A—Toluylene diisocyanate
Component B—consisting of
  50 parts by weight of a polyester of 2.5 mols of adipic acid, 0.5 mol of phthalic acid, 4 mols of a triol, such as for example glycerine, hexanetriol, trimethylol propane, 50 parts by weight of a polyester of 13 mols of adipic acid, 2 mols of triol, 3 mols of butylene glycol,
  10 parts by weight of filler,
  10–15 parts by weight of an activator mixture consisting of water, emulsifier and accelerator with a base of adipic acid and n-diethanolamino ethanol, mixed in the ratio of 4:2:6.

Component B is passed through the injection chamber at a flow rate of 3 l./min. and at a pressure of 25 atmospheres. The component A is counter-currently injected into the flowing mixture (component B) at a rate of 2.25 l./min. using a pressure of about 180 atmospheres.

The mixture thus obtained is introduced into a space of smaller cross-sectional area (tangential bores 11 in FIGURE 1 and bores 16 of the nozzle plate 17 in FIGURE 2) into a space of larger cross-sectional area (eddy chamber 12 in FIGURE 1 and chamber 18 in FIGURE 2). The final mixture is discharged in the liquid state through an orifice (13 in FIGURE 1 and 20 in FIGURE 2). Outside the apparatus at any desired place reaction takes place to give a rigid polyurethane foam.

*Example 3*

For the production of elastic polyurethane foam, a component I consisting of 100 parts by weight of a polyester obtained by thermal esterification of
  15 mols of adipic acid,
  16 mols of diethylene glycol and
  1 mol of trimethylene propane, and
47 parts by weight of toluylene diisocyanate, is delivered into the mixing chamber of the hereinabove-described apparatus. The necessary amount of a component II is injected into component I by means of spring-loaded injection nozzles, the said component II comprising 10 parts by weight of activator mixture consisting of
  3 parts by weight of bis-(diethyl aminoethanol) adipate,
  1 part by weight of diethyl amine oleate,
  1.5 parts by weight of sodium salt of a sulphonated castor oil containing 54% water,
  1.5 parts by weight of sulphonated ricinoleic acid, and
  1 part by weight of water As a result a homogeneous reactive mixture is obtained which forms a uniform polyurethane foam when allowed to stand.

*Example 4*

To produce a hard polyurethane foam the following formulation is used:

100 parts by weight of polyester produced from
  5 mols of adipic acid,
  1 mol of phthalic anhydride and
  8 mols of hexanetriol,
3 parts by weight of N-diethyl-$\beta$-phenoxyethyl amine,
4 parts by weight of sodium salt of a sulphonated castor oil containing 54% of water and
85 parts by weight of toluylene diisocyanate.

The injection chamber, containing the component I, becomes clogged within 2 minutes due to leakage through the injection nozzle of component II if the relief valve disclosed hereinabove is not provided.

*Example 5*

In the production of cold-polymerizing copolymers derived from polyester resins containing maleic acid, monomeric styrene and peroxide, an interruption of the mixing operation leads to clogging due to leakage through the injection nozzle injecting the peroxide/styrene mixture. No clogging, however, occurs when using the embodiment of the apparatus illustrated in FIGS. 6–8, which contains a relief valve.

While certain representative embodiments and details have been shown for the purpose of illustrating this invention, it will be apparent to those skilled in the art that various changes and modifications may be made therein without departing from the spirit and scope of the invention.

What is claimed is:

1. A mixing apparatus for intimately mixing the reaction components of a polyurethane plastic which comprises a housing, an injection means disposed within said housing for introducing the less viscous reaction component into an inoculation chamber, conduit means provided through said housing to introduce the more viscous reaction component into said inoculation chamber and countercurrently to the direction imparted to said less viscous reaction component by said injection means, a supply passage, a means for transferring the reaction components from said inoculation chamber to said supply passage under turbulent flow which comprises an opening into said inoculation chamber which increases in cross-sectional dimension in the direction of said supply passage, a cylindrical eddy chamber connected to said supply passage by a plurality of conduits which enter said eddy chamber tangentially to impart rotative motion to said reaction components within said eddy chamber and thus create turbulence therein and a means for discharging the resulting reaction mixture from said eddy chamber.

2. An apparatus for intimately mixing the reaction components of a polyurethane plastic which comprises a housing, a plurality of injection nozzles disposed within said housing for introducing the less viscous reaction component into a plurality of inoculation chambers, conduit means provided through said housing to introduce the more viscous reaction component into said plurality of inoculation chambers and countercurrently to the direction imparted to said less viscous reaction component by said injection nozzles, a semi-annular groove connecting an annular chamber with said plurality of inoculation chambers, said semi-annular groove having an increasing cross-section in a direction toward said annular chamber, a cylindrical eddy chamber disposed concentrically with said annular chamber and connected thereto by a plurality of bores which enter said eddy chamber tangentially to impart rotative motion to the reaction components within said eddy chamber and thus create turbulence therein and a means for discharging the resulting reaction mixtures from said eddy chamber.

3. A mixing apparatus for intimately mixing the reaction components of a polyurethane plastic which comprises a housing, an injection means disposed within said housing for introducing the less viscous reaction component into an inoculation chamber, a means for delivering said less viscous reaction component to said injection means comprising a pumping means connected to said injection means by a conduit, said conduit having a relief valve therein adapted to deliver said less viscous reaction component to said injection means in one position and to return said less viscous component to said pumping means in a second position, conduit means provided through said housing to introduce the more viscous reaction component into said inoculation chamber and countercurrently to the direction imparted to said less viscous reaction component by said injection means, a channel means connecting said inoculation chamber wtih a supply chamber, said channel means having an increasing cross-section in a direction toward said supply chamber, a cylindrical eddy chamber connected to said supply chamber by a plurality of bores which enter said eddy chamber tangentially to impart rotative motion to reaction components within said eddy chamber and thus create turbulence therein and a means for discharging the resulting reaction mixture from said eddy chamber.

References Cited in the file of this patent

UNITED STATES PATENTS

| | | |
|---|---|---|
| 860,259 | Smith | July 16, 1907 |
| 1,110,147 | Saltzman et al. | Sept. 8, 1914 |
| 2,199,454 | Andler et al. | May 7, 1940 |
| 2,310,633 | Heimburger | Feb. 9, 1943 |
| 2,378,184 | Carlson | June 12, 1945 |
| 2,443,570 | Udale | June 15, 1948 |
| 2,489,823 | Senninger | Nov. 29, 1949 |
| 2,622,533 | Schlieder | Dec. 23, 1952 |
| 2,642,403 | Hillier | June 16, 1953 |
| 2,672,820 | Hillier | Mar. 23, 1954 |
| 2,723,880 | Axelson | Nov. 15, 1955 |
| 2,737,415 | Wheeler-Nicholson | Mar. 6, 1956 |
| 2,754,228 | Bede | July 10, 1956 |
| 2,764,565 | Hoppe et al. | Sept. 25, 1956 |
| 2,802,652 | Caswell | Aug. 13, 1957 |
| 2,819,928 | Liedberg | Jan. 14, 1958 |